United States Patent [19]

Kissa

[11] Patent Number: 5,321,779
[45] Date of Patent: Jun. 14, 1994

[54] OPTICAL SUBSTRATE WITH LIGHT ABSORBING SEGMENTS

[75] Inventor: Karl M. Kissa, Belmont, Mass.

[73] Assignee: The Charles Stark Draper Laboratory, Inc., Cambridge, Mass.

[21] Appl. No.: 972,628

[22] Filed: Nov. 6, 1992

[51] Int. Cl.[5] .............................................. G02B 6/12
[52] U.S. Cl. ...................................... 385/14; 385/129
[58] Field of Search ........................................ 385/1-3, 385/11, 12, 29, 49, 129-132, 146, 14

[56] References Cited

U.S. PATENT DOCUMENTS 4,348,074  9/1982  Burns et al. ............................ 385/14

FOREIGN PATENT DOCUMENTS 63-142332  6/1988  Japan ...................................... 385/14

Primary Examiner—Rodney B. Bovernick
Assistant Examiner—John Ngo
Attorney, Agent, or Firm—Lappin & Kusmer

[57] ABSTRACT

A substrate for use with integrated optical circuits. The substrate includes an input surface and an output surface for respectively receiving light to the substrate and transmitting light from the substrate. Lateral surfaces extend between the input and output surfaces. A light propagation path extends between the input and output surfaces. One or more cavities extend from the lateral surfaces to the interior of the substrate. The boundary between the cavities and the substrate bear an optical absorber. With this configuration, stray light within the substrate, e.g. from the input surface from the declined propagation path is absorbed by the absorbers before it can reflectively be transmitted back to the defined propagation path and output surface.

19 Claims, 4 Drawing Sheets

OPTICAL SUBSTRATE WITH LIGHT ABSORBING SEGMENTS

FIELD OF THE INVENTION

The present invention is in the field of optical signal processing and more particularly relates to integrated optical circuits.

BACKGROUND OF THE INVENTION

Integrated optical circuits provide signal processing for fiber optic systems such as fiber optic gyroscopes. Such integrated optical circuits comprise a substrate that carries light propagating and light processing elements. Typically, a waveguide is embedded in a surface region of the substrate for propagating light, and processing elements such as light splitters, phase modulators, or delay lines, are disposed along the waveguide to provide the desired signal processing. Input and output optical fibers are optically coupled to the substrate to provide an input optical signal, and to receive a processed output signal, respectively. While it is intended that light be within the substrate in specific regions (e.g., waveguide and associated processing regions), as a practical matter light propagates elsewhere in the substrate, as well as in the desired regions.

Light that travels along paths other than the waveguide, or desired processing regions, i.e., "stray light", can degrade the quality of the optical signal and affect processing. The major source of stray light is imperfect optical coupling between the optical fibers and the waveguide, although stray light can also be introduced by other mechanisms such as by spurious radiation from the signal processing elements. Stray light will corrupt the optical signal if the stray light is transferred to the waveguide or to the output optical fiber.

One method of reducing the effect of stray light on the optical signal is to roughen, or "texture", outer surfaces of the substrate and to coat those outer surfaces with a light absorbing material. This method relies on absorbing the stray light rays that strike the outer surfaces of the substrate. This method is generally ineffective because, as is described by Fresnel's Reflection Law, a light striking a surface has an absorbed component and a reflected component. The strength of the reflected component is dependant upon the angle of incidence, such that the strength of the reflected component decreases as the angle of incidence approaches 90 degrees. Since, in typical situations, much of the stray light is incident on the outer surfaces of a substrate at oblique angles, strong reflected components are generated and are propagated back into the substrate, despite the surface coating of light absorbent material. The ineffectiveness of this method is further compounded by mismatches between the optical refractive indexes of the substrate and the absorber. Typically, no more than 20% of the stray light can be absorbed if conventional absorbers are used, and the stray light has an angle of incidence of less than 20 degrees.

Another method of reducing the deleterious effects of stray light is to adjust the alignment between the input optical fiber and an optical waveguide in the substrate so as to minimize the stray light produced at the coupling. Unfortunately, minimizing the stray light in this way also reduces the efficiency of the coupling between the optical fiber and the waveguide, so stray light is reduced at the expense of lowering the signal strength. Also, computer simulations indicate that the reduction of stray light achieved by this method is marginal at best.

Thus there is a need for a better method of reducing the deleterious effects of stray light in optical substrates.

SUMMARY OF THE INVENTION

The invention is an improved integrated optical circuit (IOC) device including an optically transmissive substrate having optically absorbing segments dispersed in the substrate. The substrate includes an input surface region for receiving an input optical signal from a region exterior to the substrate. An input waveguide region extends from the input surface region along an input axis into the interior of the substrate. The substrate also includes an output surface region for transmitting an output optical signal to a region exterior to the substrate. An output waveguide region extends along an output axis from the interior of the substrate to the output surface region. In some forms of the invention, the input and output waveguide regions are coupled (directly or indirectly) so that light can propagate from the input waveguide region to the output waveguide region.

The substrate also has a lateral surface region which extends between the input surface region and the output surface region One or more cavities extend from the lateral surface region into the interior of the substrate along an absorber axis that extends at least partially in a direction perpendicular to the input axis, with the cavities being spaced apart at least partially in the direction of the input axis. In some embodiments, however, there is only a single cavity which is spaced apart from the input surface in the direction of the input axis. An optically absorbent material is disposed along at least the surfaces of the substrate adjacent to, i.e. defining, the cavities. The light absorbers may be solid, filling the cavities, or may be surface coatings at the cavity-substrate interface.

With this configuration, stray light within the substrate, such as light entering the substrate at the input surface region, or light emanating from a waveguide region, is effectively absorbed so that such light is kept from re-entering a waveguide region or from being incident on the output surface region.

In a preferred form, the substrate is a rectangular cross-section (along the input axis) parallelpiped having end faces on opposite ends thereof, and having four lateral faces extending between the end faces, with the input surface region being on one of the end faces, and the output surface region being on the other of the end faces. The input and output waveguide regions may be contiguous with to a first of the lateral faces and the cavities may extend into the substrate from the one of the faces opposite that first lateral surface.

In general, said cavities are positioned so that substantially all stray light in substrate (i.e. light other than that in the waveguide regions) is absorbed by the light absorbent material. It is preferred that the absorbers be aligned at least in part substantially transverse to the axis of the input waveguide region, but in addition, or instead, the absorbers may be at any angle with respect to that waveguide axis, and may extend from any lateral surface.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
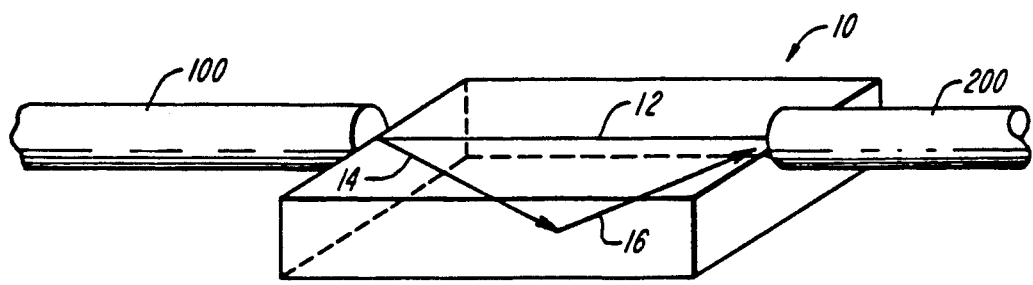
FIG. 1 shows a perspective view of a prior art optical substrate.
Figure 2:
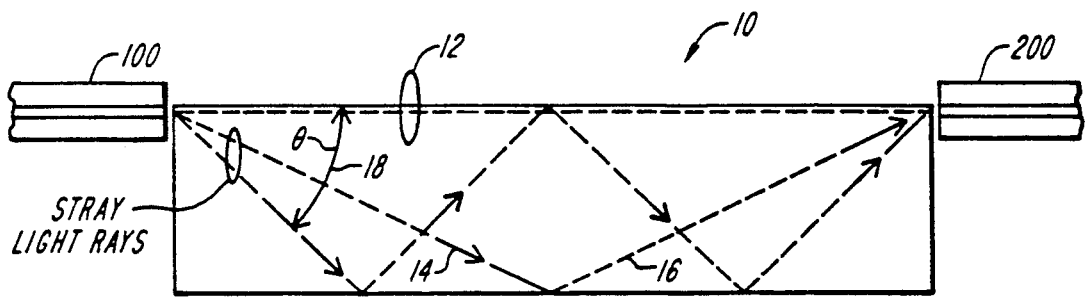
FIG. 2 shows a sectional view of the optical substrate of FIG. 1, showing exemplary light propagation paths.

A prior art optical substrate 10 is shown in FIGS. 1 and 2. A waveguide 12 is embedded in the top of the substrate, and in use the waveguide 12 is coupled to an input optical fiber 100 and an output optical fiber 200. The optical fiber 100 transfers an input optical signal to the waveguide 12, but due to imperfect optical coupling, a stray (exemplified by light ray 14) is also introduced into the substrate 10. As illustrated, the stray light ray 14 strikes the bottom surface of the substrate 10, whereupon a reflected component 16 is generated. As shown in FIG. 2, the reflected component 16 will corrupt the optical signal if its trajectory is such that the reflected component 16 is transferred to the waveguide 12 or to the output optical fiber 200.

Figure 3:
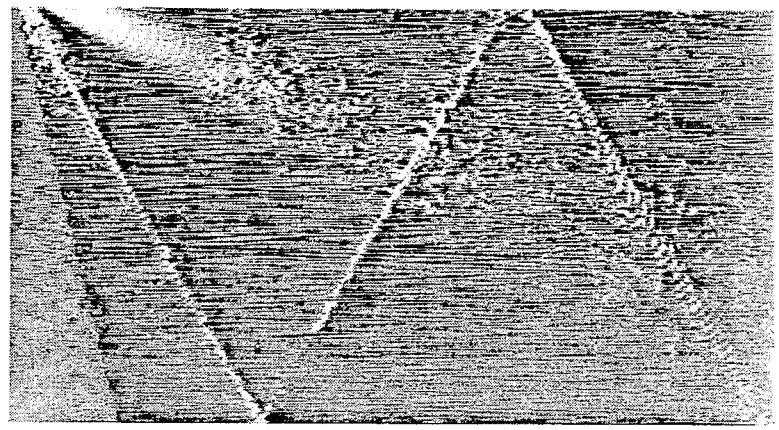
FIG. 3 illustrates a computer simulation of the effects of stray light in the optical substrate of FIGS. 1 and 2.

FIG. 2 represents a substrate with vertical (as shown) cross section of 4 cm×2 mm. FIG. 2 is not drawn to scale, and it is important to note that an angle 18 at which stray light enters the substrate 10 is normally less than ten degrees. Thus stray light introduced from fiber 100 encounters the bottom surface of the substrate 10 with an oblique angle and generates a strong reflected component 16. FIG. 3 illustrates a computer simulation of the effects of stray light in the substrate 10 shown in FIG. 2. As can be seen in FIG. 3, large concentrations of stray light are present at the coupling of the output optical fiber 200 and the substrate 10 thus significantly degrading the optical signal entering fiber 200.

Figure 4:
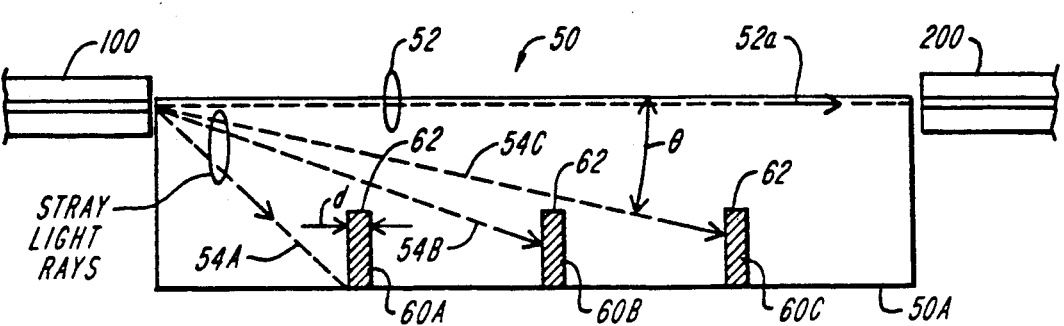
FIG. 4 shows a sectional view of an optical substrate according to the invention.

FIG. 4 illustrates a cross section of a substrate 50 according to the invention. The substrate 50 has a waveguide 52 adjacent to its top surface and extendinq along a propagation axis 52a. Substrate 50 also includes three light absorbers 60A, 60B and 60C, each extending inwardly from the bottom surface 50A of substrate 50. The substrate 50 of FIG. 4 is not drawn to scale. In the preferred embodiment, substrate 50 is a rectangular Parallelpiped with a cross section of 4 cm by 2 mm. The absorbers 60A–60C are composed of conventional light absorbent material, such as optically opaque epoxy, e.g. type EPO-TEK 320 epoxy manufactured by Epoxy Technology, Inc., Billerica, Massachusetts, and are fixed within corresponding cavities machined into the substrate 50. The absorbers 60A–60C are relatively thin (depth d, e.g., 0.34 mm) rectangular parallelpipeds, having their principal planes substantially perpendicular to axis 52a, although other configurations can be used.

The absorbers 60A–60C are spaced apart in the direction of axis 52a so that they collectively intercept stray light, as illustrated by illustrative rays 54A–54C, at a near normal incidence. Since the absorbers 60A–60C intercept most of the stray light at near normal incidence, the reflected components from the substrate-to-absorber interface will be weak, thus effectively attenuating the stray light. Since the absorbers 60A–60C are orthogonal to the bottom surface 50A of the substrate 50, any stray light that does not intersect the absorbers with a near normal incidence, will intersect the bottom surface 50A of the substrate, so it may also be advantageous to coat the bottom surface with a light absorbent material.

Figure 5:
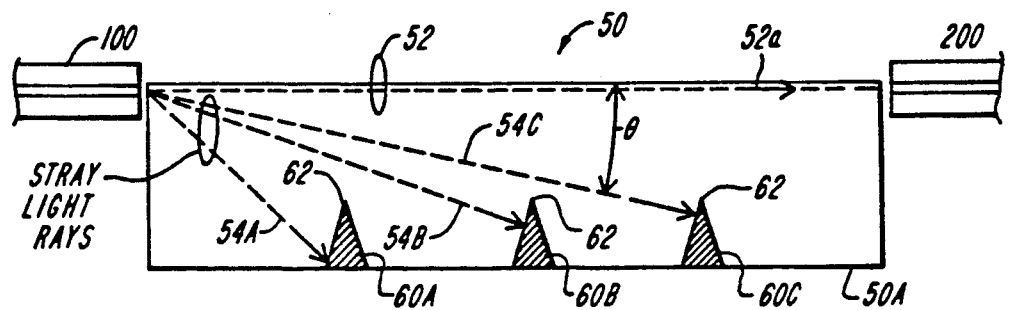
FIG. 5 shows an alternative embodiment of the substrate shown in FIG. 4.

It is preferred for the light absorbers to have a relatively thin cross section so that the tops of the absorbers do not present a large surface from which stray light may reflect. To minimize this effect by providing minimum width top surfaces, the absorbers may have a triangular (upright) cross-section, i.e. the absorbers are wedge-shaped, or a trapezoidal (upright) cross-section, for example. An embodiment of the invention incorporating upright triangular, wedge-shaped absorbers is shown in FIG. 5. Alternatively, such wedge-shaped absorbers can be inverted thereby directing reflected light toward the bottom of the substrate, although providing a relatively wide top surface to the absorber.

In FIG. 5, elements corresponding to similar elements in the embodiment of FIG. 4 are illustrated with the same reference designations. The embodiment of FIG. 5 is also advantageous because the inclined input face of the absorbers causes stray light from fiber 100 to strike the absorbers with an angle that is even closer to perpendicular than is achieved by the absorbers in FIG. 4, thus even further attenuating the stray light.

Figure 6:
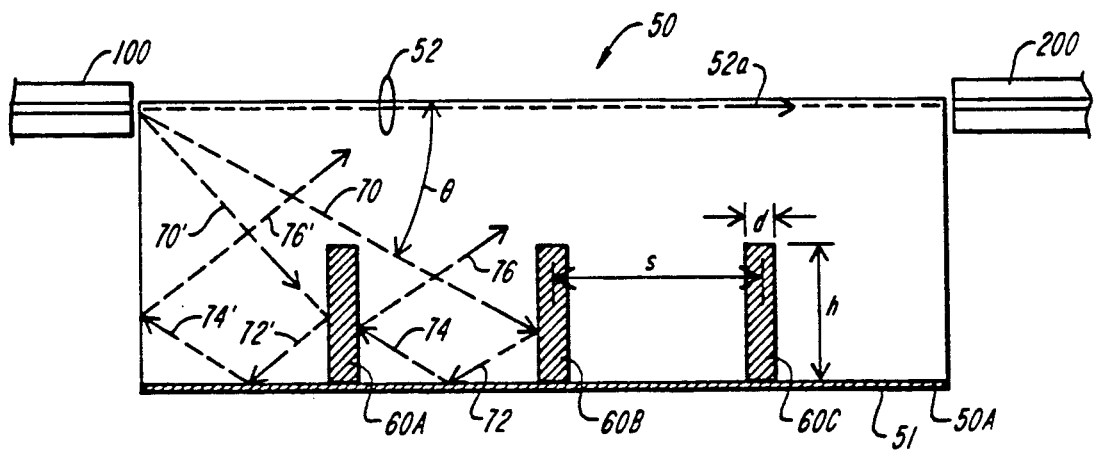
FIG. 6 shows the effects of reflection of stray light off of the absorbers of the substrate shown in FIG. 4.

FIG. 6 illustrates the effect of components of stray light reflected off of the absorbers of FIG. 4. By way of example, a stray light ray 70 strikes the absorber 60B at near normal incidence thus generating a weak reflected component 72. The component 72 then strikes the bottom surface 50A, which bears a light absorbing layer 51, thus generating a reflected component 74 which then strikes a second absorber 60A, again at near normal incidence, and generating an even further attenuated reflected component 76. Component 76 may have a trajectory that will allow it to propagate to the waveguide 52 or to the output optical fiber 200, but component 76 is so attenuated that it causes only minimal degradation of the optical signal.

Figure 7:
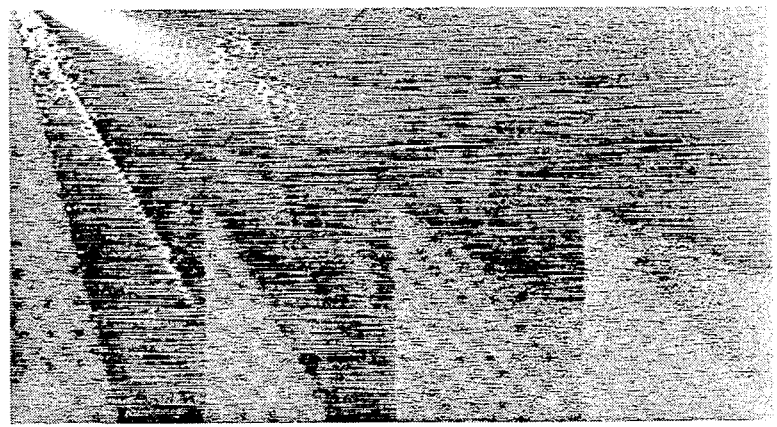
FIG. 7 illustrates a computer simulation of the effects of stray light in the substrate shown in FIG. 4.

FIG. 7 is a computer simulation (showing forward traveling light) of the effect of stray light on a substrate similar to that illustrated in FIG. 4. Comparing FIG. 7 with FIG. 3 illustrates that the substrate according to the invention achieves a substantial reduction of stray light reaching the output optical fiber.

The embodiments illustrated in FIGS. 4–6 are preferred because they are simple to manufacture. In the embodiments of FIGS. 4–6, the substrate 50 is a right-rectangular-parallelpiped (i.e., a polyhedron in which every face is a rectangle, and all angles are right angles) made of lithium niobate. Other materials may be used such as glass, gallium arsenide, silicon, and organic polymers (such as polymethyl methacrylate. In other embodiments, different geometrics may be used, for example, non-right parallelpiped. In the embodiments of FIGS. 4 and 6, the waveguide 52 is embedded in the top surface of the substrate 50, and the absorbers 60A-60C are fitted within cavities that also have a right-rectangular-parellelepiped shape. As shown, the cavities are generally parallel to the input face of substrate 50, but in other embodiments, they may be angularly offset with respect to that input face. The absorbers 60A-60C are made of optically opaque epoxy. In the preferred embodiment, the substrate 50 extends 4 cm in the direction of axis 52a, and has a cross section of 4 cm×2 mm. The absorbers 60A-60C extend across the full width of substrate 50, have a depth d=0.34 mm and a height h=1 mm, and have an inter-absorber spacing (center-to-center) s=10 mm. In FIG. 6, a light absorbing layer 51, such as optically opaque epoxy with a thickness 0.3 mm, is disposed on the bottom surface 50A. The cavities are easily cut with a circular saw so that they extend fully across surface 50A. Alternatively, those cavities may extend only partially across that surface. However, despite the ease of manufacture of this embodiment, other embodiments may be preferable due to improved optical performance.

Figure 8:
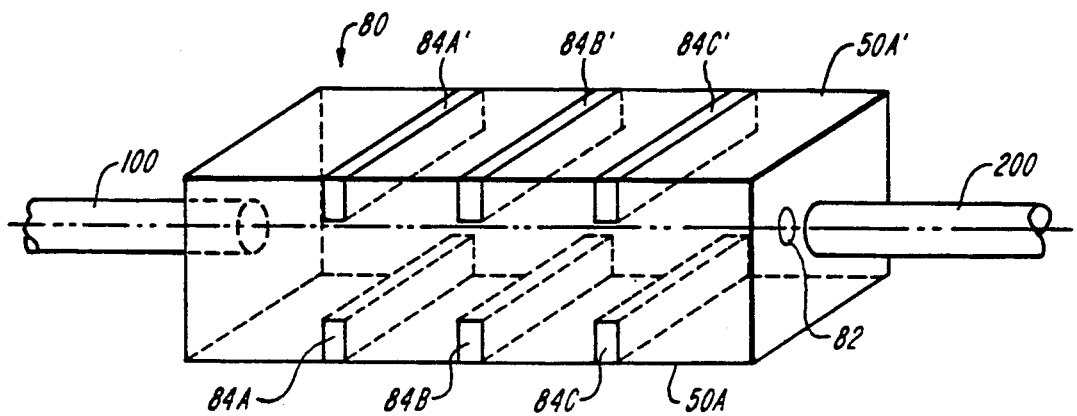
FIG. 8 shows an optical substrate according to the invention with light absorbers disposed above and below a waveguide.
Figure 9:
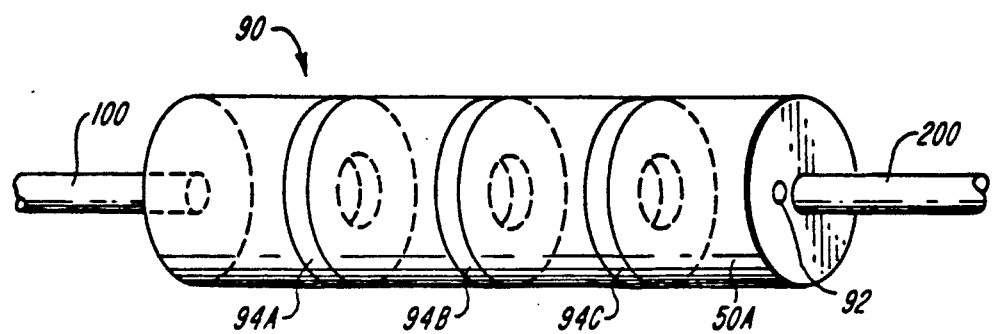
FIG. 9 shows a cylindrical optical substrate according the invention.
Figure 10:
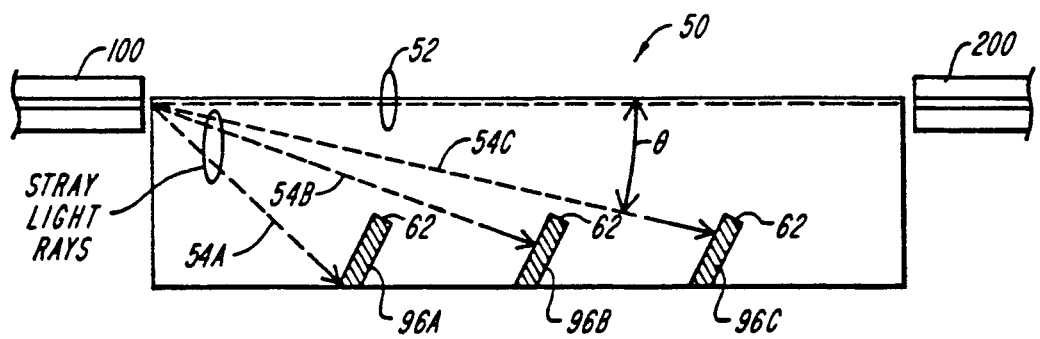
FIGURE 10 shows a substrate according to the invention in which the absorbers are disposed at an oblique angle.

For example, as shown in FIG. 8, it is sometimes preferable to form the substrate 80 out of a plurality of layers with a waveguide 82 embedded between the layers. In this embodiment absorbers 84 are disposed on both the top and bottom of the substrate. FIG. 9 illustrates another alternative embodiment in which the substrate 90 is cylindrical with a waveguide 92 embedded along a long axis of the substrate. Absorbers 94 are disposed within annular cavities extending inwardly from the lateral surface of the substrate. FIG. 10 illustrates yet another alternative rectangular geometry embodiment similar to that of FIG. 4, but where plate-type absorbers are disposed at an offset angle rather than being perpendicular to the propagation axis of a waveguide so as to increase the "normalness" of the angle with which stray light strikes the absorbers. Elements in the embodiment of FIG. 10 that correspond to elements of FIG. 4 are identified with the same reference designations.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An integrated optical circuit (IOC) device comprising:
   A. an optically transmissive substrate including:
      i. an input surface region adapted to receive an input optical signal from a region exterior to said substrate, and an associated waveguide region extending from said input surface region along an input axis into the interior of said substrate,
      ii. an output surface region adapted to transmit an output optical signal to a region exterior to said substrate, and an associated waveguide region extending from said output surface region along an output axis into the interior of said substrate,
      iii. a lateral surface region extending between said input surface and said output surface,
      iv. one or more cavities extending from said lateral surface into the interior of said substrate along an absorber axis that extends at least partially in a direction perpendicular to said input axis, and said cavities being spaced apart in the direction of said input axis, and
   B. an optically absorbent material disposed along at least the surfaces of said substrate defining said cavities.

2. An integrated optical circuit device according to claim 1,
   wherein said substrate is a parallelpiped having end faces on opposite ends thereof and four lateral faces extending between said end faces, wherein said input surface region is on one of said end faces and said output surface region is on the other of said end faces, and wherein said input axis and said output axis are defined so that input waveguide region is coupled to said output waveguide region permitting propagation of light from said input waveguide region to said output waveguide region, and where said input and output waveguide regions are adjacent to a first of said lateral faces, and
   wherein said cavities extend into said substrate from the one of said faces opposite said first lateral surface.

3. An integrated optical circuit device according to claim 2 wherein said cavities have a substantially identical shapes and said cavities have a substantially rectangular cross-section in the direction transverse to said input axis, and extend transverse to said input axis at least partially across said face opposite said first lateral surface region, and have a substantially rectangular cross-section in the direction of said input axis, and
   wherein the principal planes of said cavities transverse to said input axis are substantially parallel.

4. An integrated optical circuit device according to claim 3 wherein said cavities extend entirely across said face opposite said first lateral surface.

5. An integrated optical circuit device according to claim 3 wherein said principal planes of said cavities are perpendicular to said input axis.

6. An integrated optical circuit device according to claim 3 wherein said principal planes of said cavities are angularly offset with respect to said input axis at an angle other than ninety degrees.

7. An integrated optical circuit device according to claim 2 wherein said cavities are substantially identical in shape and said cavities have a substantially rectangular cross-section in the direction transverse to said input axis, have a substantially triangular cross-section in the direction of said input axis, and extend transverse to said input axis at least partially across said face opposite said first lateral surface region.

8. An integrated optical circuit device according to claim 7 wherein said cavities extend entirely across said face opposite said first lateral surface region.

9. An integrated optical circuit device according to claim 6 wherein said cavities are greater in length in direction of said input axis at said face opposite said first lateral surface region than interior to said substrate.

10. An integrated optical circuit device according to claim 1 wherein said cavities are positioned so that substantially all light in said substrate other than in said waveguide regions is absorbed by said absorbent material.

11. An integrated optical circuit device according to claim 1 wherein said substrate is substantially cylindrical having end faces on opposite ends thereof and a cylindrical lateral surface region extending between said end faces, wherein said input surface region is on one of said end faces and said output surface region is in the other of said end faces, and wherein said input axis and said output axis are coaxial so that said input waveguide region is connected to said output waveguide region, and wherein said waveguide regions extend through the interior of said substrate.

12. An integrated optical circuit device according to claim 11 wherein said cavities have substantially identical shapes and said cavities are annular slots extending from said lateral surface region toward said input axis, wherein said cavities have a substantially annular cross-section in the direction transverse to said input axis and have a substantially rectangular cross-section in the direction of said input axis.

13. An integrated optical circuit device according to claim 12 wherein each of said cavities extend about a principal surface that is perpendicular to said input axis.

14. An integrated optical circuit device according to claim 12 wherein each of said cavities extend about a principal surface that is conical and disposed about an axis of symmetry coaxial with said principal axis.

15. A substrate for use with integrated optical circuits, said substrate comprising:

A. mutually orthogonal length, width and length axes,

B. a first end surface and a second end surfaces on opposite ends thereof,

C. a top surface, a bottom surface extending between said first and second end surfaces, in the direction of said length axis, D. a preferred pathway for guiding the propagation of light therein through said substrate between said first and second end surfaces, wherein said pathway is substantially parallel to said length axis and is near said top surface, and E. one or more of light absorbing elements disposed in slots extending from said bottom surface into the interior of said substrate, said slots being spaced apart in the direction of said length axis.

16. A substrate according to claim 15 wherein each of said slots extend about reference planes that are at least in part angularly offset with respect to said length axis.

17. A substrate according to claim 16 wherein said slots extend fully across said bottom surface in a direction perpendicular to said length axis.

18. A substrate according to claim 17 wherein said slots are substantially identical in shape and are equally spaced along said length axis.

19. A substrate according to claim 16 wherein said slots are substantially identical in shape and are equally spaced along said length axis.

* * * * *